Figure 1:
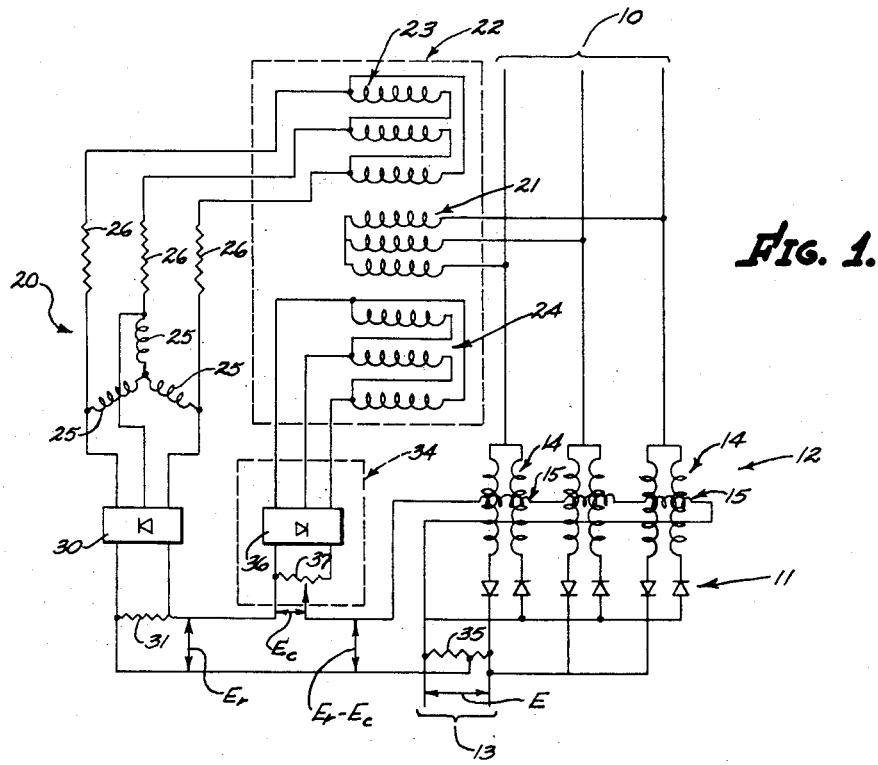

March 17, 1959  S. L. CHRISTIE ET AL  2,878,437
RECTIFIER CONTROL SYSTEM
Filed Feb. 8, 1954

INVENTORS.
SOREN L. CHRISTIE
FRANK C. MARSHALL
BY THEIR ATTORNEYS.
HARRIS, KIECH, FOSTER & HARRIS

United States Patent Office 2,878,437
Patented Mar. 17, 1959

2,878,437
RECTIFIER CONTROL SYSTEM

Soren L. Christie and Frank C. Marshall, Los Angeles, Calif., assignors to Christie Electric Corp., a corporation of California Application February 8, 1954, Serial No. 408,920

11 Claims. (Cl. 321—18)

The present invention relates to rectifiers and a primary object of the invention is to provide a rectifier control system which will maintain the output voltage of a rectifier constant within very narrow limits despite load and line voltage fluctuations and/or line frequency variations.

More particularly, an object of the invention is to provide a rectifier control system having means for producing a stable reference voltage with which the output voltage of a rectifier may be compared to derive an error voltage for application to a voltage regulating means associated with the rectifier.

An important object of the invention is to provide a simple and stable rectifier control system utilizing simple and sturdy components capable of operating for long periods of time with little or no maintenance. The present invention thus overcomes the difficulties inherent in prior rectifier control systems utilizing constant voltage gaseous tubes with amplifiers, filters and anti-hunting components, which prior systems are complicated and expensive and require a great deal of maintenance and adjustment, and the elimination of such disadvantages of prior systems is an important object of the invention.

Rectifier control systems have also been proposed utilizing a saturable reactor connected to a single phase alternating current source in series with a linear impedance, such as a resistor, or a linear reactor, the saturable reactor being of the gapless core type and having a substantially rectangular hysteresis loop, and, correspondingly, a very sharp knee at the saturation point. With such a circuit, there is a definite maximum reactive voltage which the core can absorb at a given frequency and any tendency for the voltage to increase beyond this maximum results in an increase in current which is limited almost entirely by the resistance of the saturable reactor and the resistance of the linear impedance in series therewith. Since the resistance of the saturable reactor is purposely made very small in relation to the resistance of the linear impedance, almost all of any variation in the source voltage is absorbed by the linear impedance, leaving the average voltage across the saturable reactor relatively constant. By rectifying the voltage across the saturable reactor, a direct current voltage of relatively constant average value is obtained, but this simple prior circuit does not provide a reference voltage of satisfactory accuracy for many applications. To obtain a more accurate reference voltage, various additions to the foregoing simple prior circuit have been proposed, involving the use of capacitors, as well as linear impedances, in conjunction with saturable reactors, circuits of this nature being known as ferro resonance circuits. The principle of such prior ferro resonance circuits, which are single phase circuits, is that high frequency flux oscillations take place between the saturable reactors and the capacitors, or between the saturable reactors and the linear reactors, and the resulting average voltage across the saturable reactors in such a circuit is almost independent of the applied alternating current voltage as long as a small amount of power is drawn from the circuit. However, sufficient power cannot be drawn from such prior circuits to operate a voltage regulating means for regulating the rectified voltage, and it has been necessary to utilize amplification, or to utilize very large and expensive capacitors and linear reactors.

An important object of the present invention is to provide a rectifier control system which utilizes the effect of ferro resonance, but which does this with a simple circuit utilizing small and inexpensive components without amplification, the control system of the invention involving the use of a simple three-phase circuit.

Considering the invention now in more detail, an important object thereof is to provide a rectifier control system which includes a voltage reference means or unit comprising auxiliary rectifier means and auxiliary voltage regulating means connected to the input side of the auxiliary rectifier means, the auxiliary voltage regulating means including a set of nonlinear reactors in three-phase connection connected to a three-phase alternating current source through a corresponding set of linear impedances, such as dropping resistors, linear reactors, or the like.

The foregoing voltage reference means provides a substantially constant reference voltage which may be compared with the output voltage of the main rectifier means, or a proportional part thereof, and the resulting error voltage may be applied to the voltage regulating means for the main rectifier means, this voltage regulating means, hereinafter termed the main voltage regulating means, including, for example, one or more saturable reactors having controlling windings to which the error voltage is applied.

While the reference voltage discussed above is sufficiently constant for many applications, another object of the invention is to provide for even more accurate control of the output voltage of the main rectifier means by introducing a correcting voltage into the aforementioned reference voltage. More particularly, an object is to provide a voltage correcting means which has an output voltage proportional to the voltage of at least one phase of the alternating current source for the voltage reference and which is subtractively connected in series with the output side of the auxiliary rectifier means so that the reference voltage is corrected by an amount equal to the correcting voltage, the resulting corrected reference voltage then being compared to the main rectifier output voltage and the difference or error voltage applied to the control means of the main voltage regulating means.

Another object is to provide a voltage correcting means which compensates for variations in the frequency of the alternating current supply in instances where the supply frequency is not perfectly constant, the voltage correcting means in this instance including a substantially resonant circuit, whereby the correcting voltage varies directly, not only with the supply or line voltage, but with the frequency as well.

The foregoing objects, advantages and features of the present invention, together with various other objects, advantages and features thereof which will become apparent, may be attained with the exemplary embodiments of the invention which are illustrated in the accompanying drawing and which are described in detail hereinafter.

Figure 2:
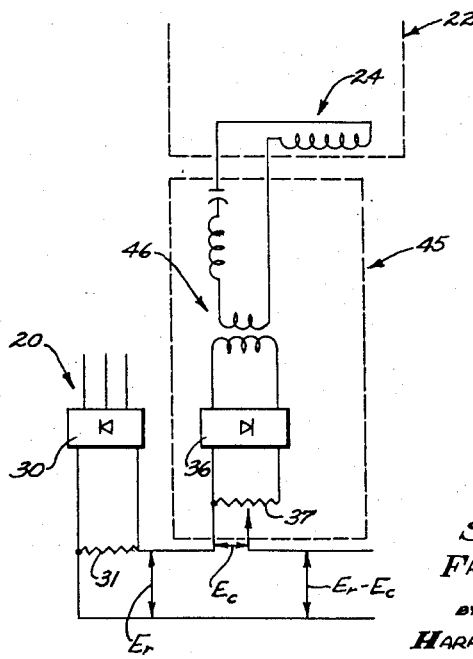

Referring to the drawing:

Fig. 1 is a diagrammatic view of a circuit embodying a rectifier and the rectifier control system of the invention; and Fig. 2 is a diagrammatic view showing fragmentarily another embodiment of the rectifier control system of the invention.

Referring to Fig. 1 of the drawing, the numeral 10 designates a three-phase alternating current source which is connected to a main rectifier or rectifier means 11 through a main voltage regulating means 12, the output of the main rectifier 11 appearing at 13 as voltage E. The main voltage regulating means 12 is shown as comprising saturable reactors having controlled windings or controlled winding means 14 and controlling windings or controlling winding means 15, the latter also being referred to herein as a control means of the main voltage regulating means 12. It will be understood that while the main rectifier 11 and the main voltage regulating means 12 are shown as connected to all three phases of the source 10, this is not essential, a three-phase source 10 being shown since a polyphase source is required for a voltage reference means 20, which will now be described.

Connected to the source 10 are the primary windings 21 of a three-phase transformer 22, this transformer having two sets of secondary windings 23 and 24 the former of which are connected to the voltage reference means 20. The latter includes a set of non-linear or saturable reactors 25 which are interconnected in three-phase connection, the particular three-phase connection shown being of the Y type, although the delta type of connection may also be used. The reactors 25 are preferably of the gapless core type with substantially rectangular hysteresis loops and are operated beyond saturation. Connected in series with the three-phase-connected reactors 25 between the secondary windings 23 and the set of reactors are linear impedances 26, which may be dropping resistors, as shown, or which may be linear reactors, or the like. The set of three-phase-connected reactors 25 is, in turn, connected to an auxiliary rectifier or rectifier means 30 the output of which appears as $E_r$ across a resistor 31.

Although a theoretical analysis of the phenomena occurring within the voltage reference means 20 is quite complicated, it is believed that the results obtained are due to flux oscillations taking place between the three non-linear reactors 25 as these reactors saturate at different times in the cycle. In any event, the net result is that the output voltage $E_r$, of the voltage reference means 20 is substantially constant and, when properly dimensioned, can be readily compared with the output voltage E of the main rectifier in such a way that the difference or error voltage is directly applied to the main voltage regulating means 12 without any necessity for the use of large and expensive components, or without any necessity for the use of amplification. Furthermore, it is not necessary to provide filter or antihunting circuits, since the alternating current component of the rectified reference voltage $E_r$, is very small and is substantially in phase with the ripple of the three-phase direct current power supply.

For many applications, the rectified voltage $E_r$ is sufficiently constant for use as a reference voltage for application to the control means 15, and, in such instances, a voltage correcting means 34 described hereinafter may be omitted. In this event, an error voltage equal to the difference between a portion of the output voltage E and the reference voltage $E_r$ is applied directly to the control means. The voltage $E_r$ is connected across the resistor 31 and the voltage E is connected across a tapped resistor 35. The voltages $E_r$ and a tapped portion of E are then connected in parallel through the control means 15. Thus, the output voltage of the main rectifier 11, or a fixed portion thereof, is directly compared with the reference voltage $E_r$ and the difference, or error voltage, is applied to the control means 15 to restore the regulated rectifier output voltage from the main rectifier 11, designated as E on the drawing, to the desired value whenever it tends to deviate from such value.

For some applications of the invention, a more accurate reference voltage is required and, in such instances, the voltage correcting means 34 is utilized. The voltage correcting means 34 comprises a rectifier or rectifier means 36 connected to at least one phase of the source 10, the rectifier 36 being shown connected to all three phases of the source by being connected to the secondary windings 24 in the particular construction illustrated. The output of the rectifier 36 appears across a resistor 37, and all, or a fixed portion of, the output voltage of the rectifier 36 is subtracted from the reference voltage $E_r$ by connecting the resistor 37, or a portion thereof, in series with the resistor 31. With the particular construction illustrated, the correcting voltage, designated as $E_c$ on the drawing, is a portion of the output voltage of the rectifier 36. The correcting voltage $E_c$ varies in direct proportion with the alternating current supply voltage provided by the source 10. The difference between the reference voltage $E_r$ and the correcting voltage $E_c$ is then utilized as a reference voltage against which the output voltage E, or a portion thereof, is compared, the resulting error voltage then being applied to the control means 15. By using $E_r$ minus $E_c$ for comparison with E, a much more constant output voltage E by the main rectifier 11 is obtained.

Referring to Fig. 2 of the drawing, in situations where the supply frequency varies, the invention provides a voltage correcting means 45 having means 46 therein for compensating for such frequency variations, the voltage correcting means 45 including the same rectifier 36 and resistor 37 as the voltage correcting means 34. The voltage correcting means 45 is shown as connected to only one phase of the source 10, by being connected to only one of the secondary windings 24, although either of the voltage correcting means 34 and 45 may be connected to one or more phases of the source. The frequency compensating means 46 comprises a substantially resonant circuit, i. e., a circuit which is operated near resonance. Consequently, the correcting voltage $E_c$ in this instance varies directly, not only with the supply voltage, but with the supply frequency, thereby providing frequency compensation, which is an important feature of the invention.

The present invention thus provides a rectifier control system having ample output for regulation of a rectified output voltage with simple components and without the use of expensive parts which are difficult to maintain and keep in adjustment, such as amplifiers, large condensers or large linear reactors, filter or special anti-hunting circuits, and the like. All of the components required for the rectifier control system of the invention may be simple, small and inexpensive and do not require special maintenance or adjustments so that a stable, sturdy control system results.

Although we have disclosed exemplary embodiments of the invention for purposes of illustration, it will be understood that various changes, modifications and substitutions may be incorporated in such embodiments without departing from the spirit of the invention as defined by the claims appearing hereinafter.

We claim as our invention:

1. In an apparatus of the character described, the combination of: main rectifier means; a three-phase alternating current source connected to said main rectifier means; main voltage regulating means for varying the output of said main rectifier means, said main voltage regulating means having control means; direct current voltage reference means including auxiliary rectifier means and including auxiliary voltage regulating means connected to the input side of said auxiliary rectifier means and to said three-phase alternating current source, said auxiliary voltage regulating means including saturable reactors in three-phase connection and impedances in series connection between said saturable reactors of said auxiliary voltage regulating means and said three-phase source providing a substantially constant reference voltage to said auxiliary rectifier means; and circuit means connected to the output sides of said main and auxiliary rectifier means and to said control means for applying to said control means an error voltage varying with variations in the relative voltage outputs of said main and auxiliary rectifier means.

2. In an apparatus of the character described the combination of: main rectifier means; main voltage regulating means connected to the input side of the main rectifier means and to an alternating current source, said main voltage regulating means having control means; voltage reference means including auxiliary rectifier means and including auxiliary voltage regulating means connected to the input side of said auxiliary rectifier means and to a three-phase alternating current source, said auxiliary voltage regulating means including saturable reactors in three-phase connection and impedances in series connection between said saturable reactors of said auxiliary voltage regulating means and said three-phase source; voltage correcting means varying with the voltage of said three-phase source, said voltage correcting means being subtractively connected in series with the output side of said auxiliary rectifier means; and circuit means connected to the output sides of said main and auxiliary rectifier means and to the output of said voltage correcting means for applying to said control means an error voltage which is a function of the difference between the output voltage of said main rectifier means and the resultant of the output voltage of said auxiliary rectifier means and the output voltage of said voltage correcting means.

3. An apparatus as defined in claim 2 wherein said voltage correcting means includes a substantially resonant circuit, whereby the output voltage of said voltage correcting means varies with variations in the frequency of said three-phase source as well as with variations in the voltage of said three-phase source.

4. An apparatus as defined in claim 1 wherein said saturable reactors of said auxiliary voltage regulating means are of the gapless core type with substantially rectangular hysteresis loops.

5. An apparatus as defined in claim 1 wherein said main voltage regulating means comprises saturable reactor means having controlled and controlling winding means, said controlling winding means constituting said control means.

6. In an apparatus of the character described, the combination of: rectifier means; a set of non-linear reactors connected to the input side of said rectifier means and interconnected in three-phase connection; a set of series-connected impedances connected to said set of nonlinear reactors and connected to a three-phase alternating current source; and voltage correcting means connected to at least one phase of the alternating current source for producing an output voltage which is a function of the voltage of the alternating current source, said voltage correcting means being subtractively connected in series with the output side of said rectifier means to provide a substantially constant reference voltage.

7. An apparatus as defined in claim 6 wherein said voltage correcting means includes a substantially resonant circuit, whereby the output voltage of said voltage correcting means varies with variations in the frequency of the alternating current source as well as with variations in the voltage thereof.

8. In an apparatus for providing a constant direct current voltage from a polyphase alternating current source, the combination of: a polyphase rectifier; a set of nonlinear reactors connected to the input side of said polyphase rectifier and interconnected in polyphase connection; a corresponding set of linear impedances series-connected in the circuit between said polyphase source and said polyphase-connected set of reactors, with said linear impedances being inserted in said circuit between said source and reactors and each having a particular value fixed in said circuit throughout the operation of the apparatus; and a load impedance connected to the output side of said polyphase rectifier whereby said apparatus provides a substantially constant direct current voltage across said load impedance independent of variations in the alternating current source.

9. In an apparatus of the character described for operation from a polyphase alternating current source, the combination of: a first polyphase rectifier; a set of nonlinear reactors connected to the input side of said first rectifier and interconnected in polyphase connection; a corresponding set of impedances series-connected between said polyphase source and said polyphase-connected set of reactors; a first load impedance connected to the output side of said first rectifier for providing a direct current reference voltage thereacross; a second rectifier; first circuit means for connecting the input side of said second rectifier to at least one phase of said polyphase source; a second load impedance connected to the output side of said second rectifier for providing a direct current voltage thereacross as a function of variations in said alternating current source; and second circuit means for interconnecting predetermined portions of said first and second load impedances providing a substantially constant direct current voltage.

10. In an apparatus of the character described for operation from a polyphase alternating current source, the combination of: a first polyphase rectifier; a set of nonlinear reactors connected to the input side of said first rectifier and interconnected in polyphase connection; a corresponding set of impedances series-connected between said polyphase source and said polyphase-connected set of reactors; a first load impedance connected to the output side of said first rectifier for providing a direct current reference voltage thereacross; a second rectifier; a reactive circuit tuned to a resonant frequency close to the nominal frequency of said alternating current source, said reactive circuit connecting the input side of said second rectifier to at least one phase of said polyphase source; a second load impedance connected to the output side of said second rectifier for providing a direct current voltage thereacross as a function of variations in amplitude and frequency of said alternating current source; and circuit means interconnecting predetermined portions of said first and second load impedances for producing a substantially constant direct current voltage.

11. In an apparatus of the character described for operation from a polyphase alternating current source, the combination of: a first polyphase rectifier; a set of nonlinear reactors connected to the input side of said first rectifier and interconnected in polyphase connection; a corresponding set of linear impedances series-connected between said polyphase source and said polyphase-connected set of reactors; a first load impedance connected to the output side of said first rectifier for providing a direct current reference voltage thereacross; a second rectifier; first circuit means for connecting the input side of said second rectifier to at least one phase of said polyphase source; a second load impedance connected to the output side of said second rectifier for providing a direct current voltage thereacross as a function of variations in said alternating current source; a third polyphase rectifier; a polyphase saturable reactor having controlled winding means and controlling winding means, said controlled winding means connecting the input side of said third rectifier to said polyphase source; a third load impedance connected to the output side of said third rectifier for providing a direct current voltage thereacross as a function of variations in the output of the apparatus; and second circuit means interconnecting predetermined portions of said first, second and third load impedances in series with said controlling winding means for maintaining said output of the apparatus at a substantially constant direct current voltage.

References Cited in the file of this patent

UNITED STATES PATENTS

| | | |
|---|---|---|
| 2,225,644 | Koppelmann | Dec. 24, 1940 |
| 2,299,942 | Trevor | Oct. 27, 1942 |
| 2,322,955 | Perkins | June 29, 1943 |
| 2,547,162 | Kidd | Apr. 3, 1951 |
| 2,579,235 | Kerns | Dec. 18, 1951 |
| 2,606,314 | Potter | Aug. 5, 1952 |
| 2,684,460 | Busemann | July 20, 1954 |